United States Patent [19]

Harigaya et al.

[11] Patent Number: 4,572,640
[45] Date of Patent: Feb. 25, 1986

[54] PHOTOGRAPHING OPERATION CONTROL DEVICE FOR CAMERA

[75] Inventors: Isao Harigaya, Kanagawa; Hideo Tamamura, Tokyo, both of Japan

[73] Assignee: Canon Kabushiki Kaisha, Tokyo, Japan

[21] Appl. No.: 623,637

[22] Filed: Jun. 25, 1984

Related U.S. Application Data

[63] Continuation of Ser. No. 416,552, Sep. 10, 1982, abandoned, which is a continuation of Ser. No. 233,335, Feb. 11, 1981, Pat. No. 4,370,043, which is a continuation of Ser. No. 4,270, Jan. 17, 1979, abandoned.

[30] Foreign Application Priority Data

Jan. 20, 1978 [JP] Japan .................................. 58-5459
Jan. 20, 1978 [JP] Japan .................................. 53-5460

[51] Int. Cl.⁴ .......................... G03B 3/00; G03B 7/16; G03B 7/26; G03B 17/38
[52] U.S. Cl. ..................................... 354/400; 354/408; 354/418; 354/421; 354/484; 354/266

[58] Field of Search ............... 354/25 R, 25 A, 25 P, 354/25 N, 27.32–27.35, 31 F, 60 R, 60 F, 139, 149, 133, 195, 196, 234, 235, 266, 268, 171, 173, 50, 51, 408, 418, 421, 234.1, 235.1, 400–407, 409, 422, 412, 484; 352/140; 250/201, 204; 355/56

[56] References Cited

U.S. PATENT DOCUMENTS

| | | | |
|---|---|---|---|
| 3,442,193 | 5/1969 | Page | 354/25 A |
| 3,618,499 | 11/1971 | Harvey | 354/25 A X |
| 3,917,395 | 11/1975 | Ogawa | 354/25 N |
| 3,921,184 | 11/1975 | Borowski | 354/51 X |
| 4,004,852 | 1/1977 | Pentecost | 354/408 X |
| 4,021,824 | 5/1977 | Uchiyama et al. | 354/418 |
| 4,080,531 | 3/1978 | Stauffer | 354/25 P X |
| 4,199,244 | 4/1980 | Shenk | 354/195 |
| 4,370,043 | 1/1983 | Harigaya et al. | 354/173 |

Primary Examiner—William B. Perkey
Attorney, Agent, or Firm—Toren, McGeady, Stanger, Goldberg, & Kiel

[57] ABSTRACT

The present invention relates to a camera having an automatic focusing device, particularly designed so that the shutter release operation is carried out only when the distance measuring operation is carried out properly before taking a photograph in order to avoid an out-of-focus photograph. During flash photography, the aperture value of the camera is controlled in accordance with the object distance value set by means of the automatic focusing device.

11 Claims, 13 Drawing Figures

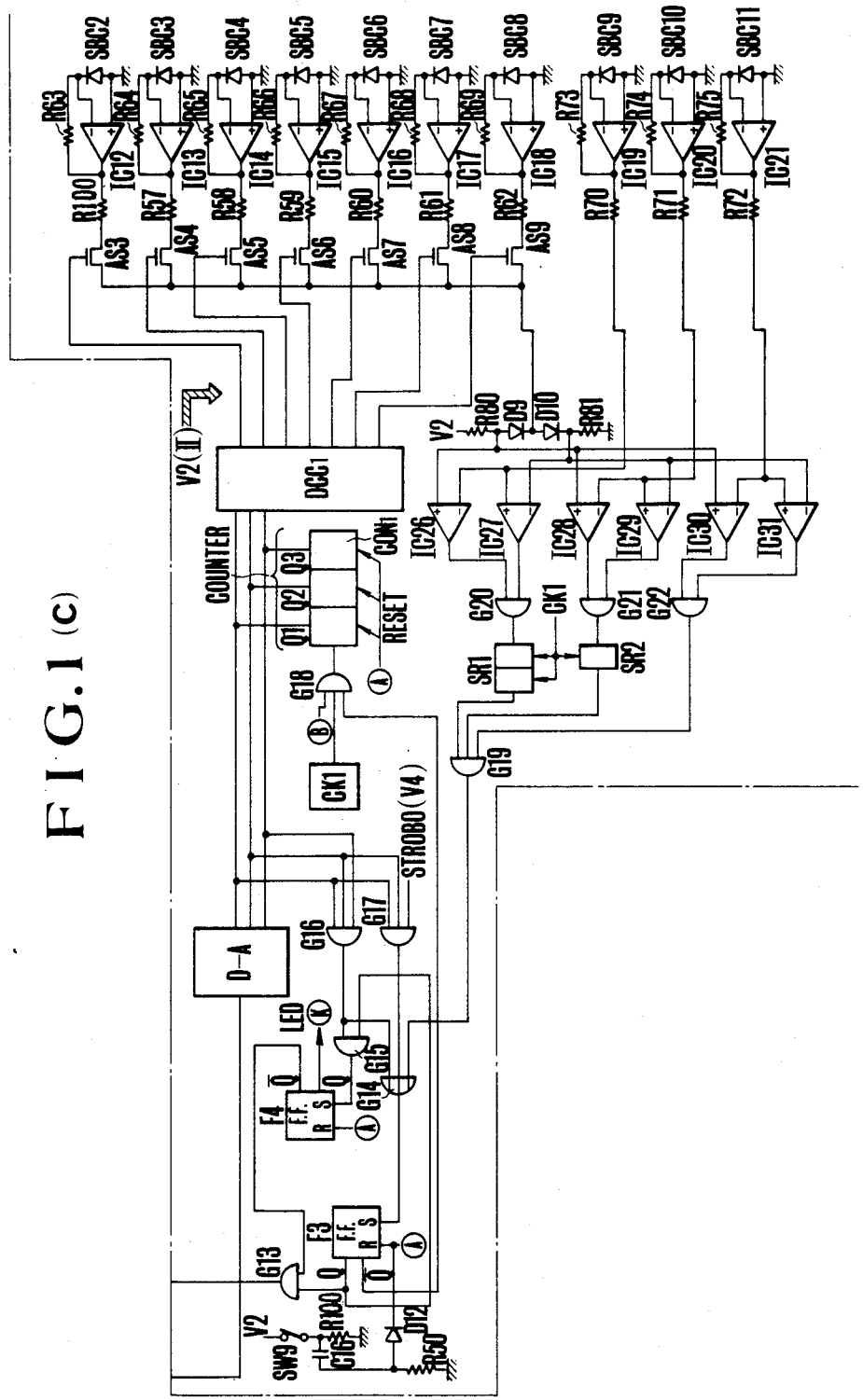

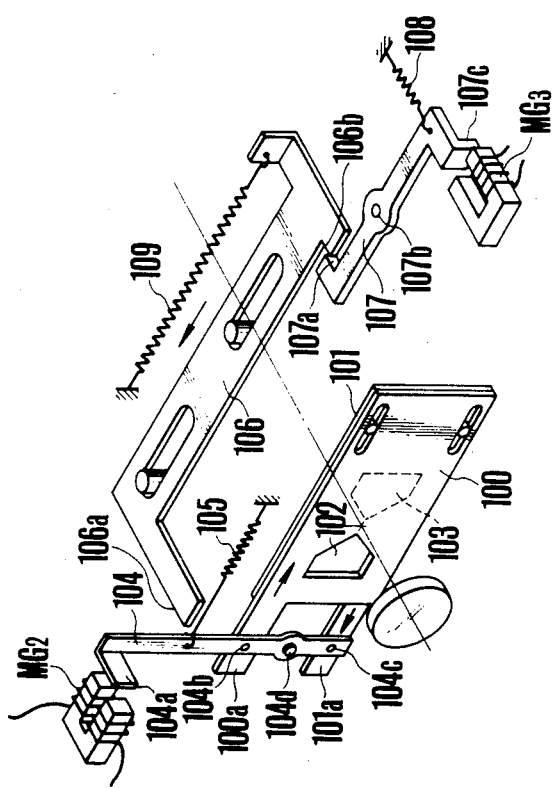

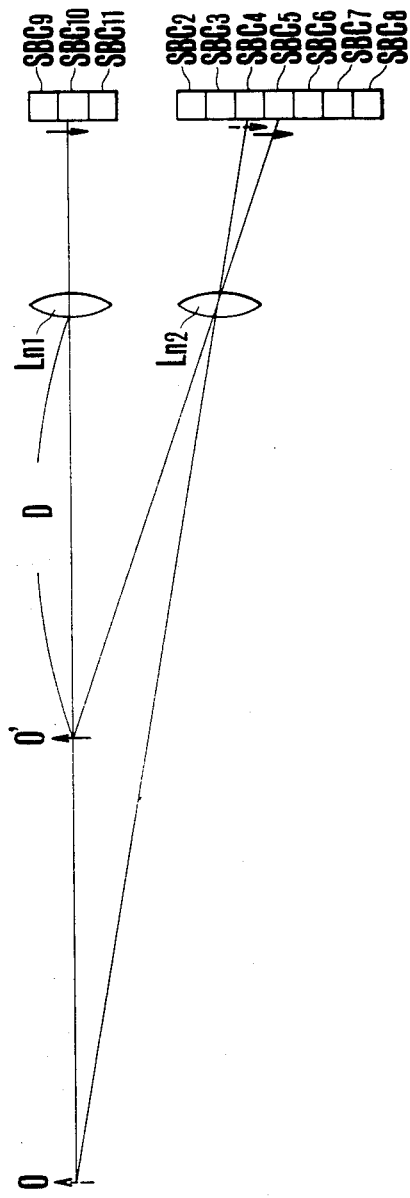

PHOTOGRAPHING OPERATION CONTROL DEVICE FOR CAMERA

This is a continuation of application Ser. No. 416,552, filed Sept. 10, 1982, now abandoned, which was a continuing application of Ser. No. 233,335, filed Feb. 11, 1981, now U.S. Pat. No. 4,370,043, which was a continuation of application Ser. No. 004,270, filed Jan. 17, 1979, now abandoned.

FIELD OF THE INVENTION

The present invention relates to a photographing operation control circuit, particularly for a camera having an automatic focus adjusting device.

DESCRIPTION OF THE PRIOR ART

In the case of the electrically controlled camera in which the electrical circuit is built to automatically control various kinds of photographing operations, aside from the automatic exposure control system, a camera having an automatic focus adjusting device (AF) for automatically focusing the photographing lens has recently been developed.

However, in the case of the conventional camera having an automatic focusing device, the automatic focusing device is simply operated before taking a photograph to carry out the distance measuring operation. Accordingly, even when the distance measuring operation is carried out properly, the shutter release operation is carried out in such a manner that an out-of-focus photograph is often taken. Further, in the case of the conventional camera having an automatic focusing device, since the distance measuring operation is simply carried out before taking the photograph, it is impossible to effectively combine it with other control circuits of the camera in accordance with the application of the camera.

In particular, considering the conventional camera having an automatic focusing device such as is disclosed, for example, in U.S. Pat. No. 3,442,193, before taking a photograph, the distance ring is driven to carry out the distance measuring operation and the magnet is operated when the in-focus state has been obtained to stop driving the distance ring. This immediately effects the shutter release operation. When the in-focus state is not obtained during the distance measuring operation, the shutter release operation is not carried out.

Consequently, in the case of the conventional device, the shutter release operation is not carried out when the in-focus state is not obtained during the distance measuring operation. When the in-focus state is obtained during the distance measuring operation, the shutter release operation is immediately carried out. Thus, even in the case when the in-focus state is detected and the distance ring actually stops being driven, and the distance value set with the distance ring is, for some reason, different from the actual object distance, the shutter release operation is carried out.

SUMMARY OF THE INVENTION

A purpose of the present invention is to provide a photographing operation control device for a camera, designed so that the shutter release operation is carried out only when, before taking a picture, the distance measuring is carried out by means of the automatic focusing device in such a manner that the distance measuring operation is properly operated. When, however, the distance measuring operation before taking a picture has failed, the automatic focusing device is brought back into the initial state in order to avoid the aforementioned shortcoming.

Another purpose of the present invention is to effectively combine the operation of the automatic focusing device with other control circuits of the camera in accordance with the current photographing mode in such a manner that the automatic focusing device is effectively operated in accordance with the current photographing mode.

Further, another purpose of the present invention is to provide a camera having an automatic focusing device suited for flash photographing mode, which is designed so that, in the case of flash photography, the exposure control circuit of the camera is controlled in accordance with the distance information produced by means of the automatic focusing device.

Further, another purpose of the present invention is to provide a photographing control device of the camera which is designed so that, when the distance measuring operation is not properly operated by means of the automatic focusing device, the motor for feeding the film and charging the distance ring is used only for charging the distance ring in order to avoid the aforementioned shortcoming.

Further, another purpose of the present invention is to provide a photographing control device of the camera, which is designed so that the shutter release operation is carried out only when the in-focus signal continues to be produced for a certain determined time after the distance measuring operation by means of the automatic focusing device has been carried out in such a manner that the shutter release operation is always carried out only when the distance measuring operation has properly been completed.

For a better understanding of the present invention, reference is made to the following description and accompanying drawings, while the scope of the present invention will be pointed out in the appended claims.

BRIEF DESCRIPTION OF THE DRAWINGS

In the drawing:

FIG. 2(b) shows an embodiment of the shutter mechanism to be applied to the present invention;

FIG. 3 shows the arrangement of the optical system and the sensors of the automatic focusing device.

DESCRIPTION OF THE PREFERRED EMBODIMENTS

FIG. 1 shows an embodiment of the circuit of the camera in accordance with the present invention, whereby the circuit is shown divided into five parts as is shown in (A), (B), (C), (D) and (E) and composed as is shown in (F).

Figure 1A:
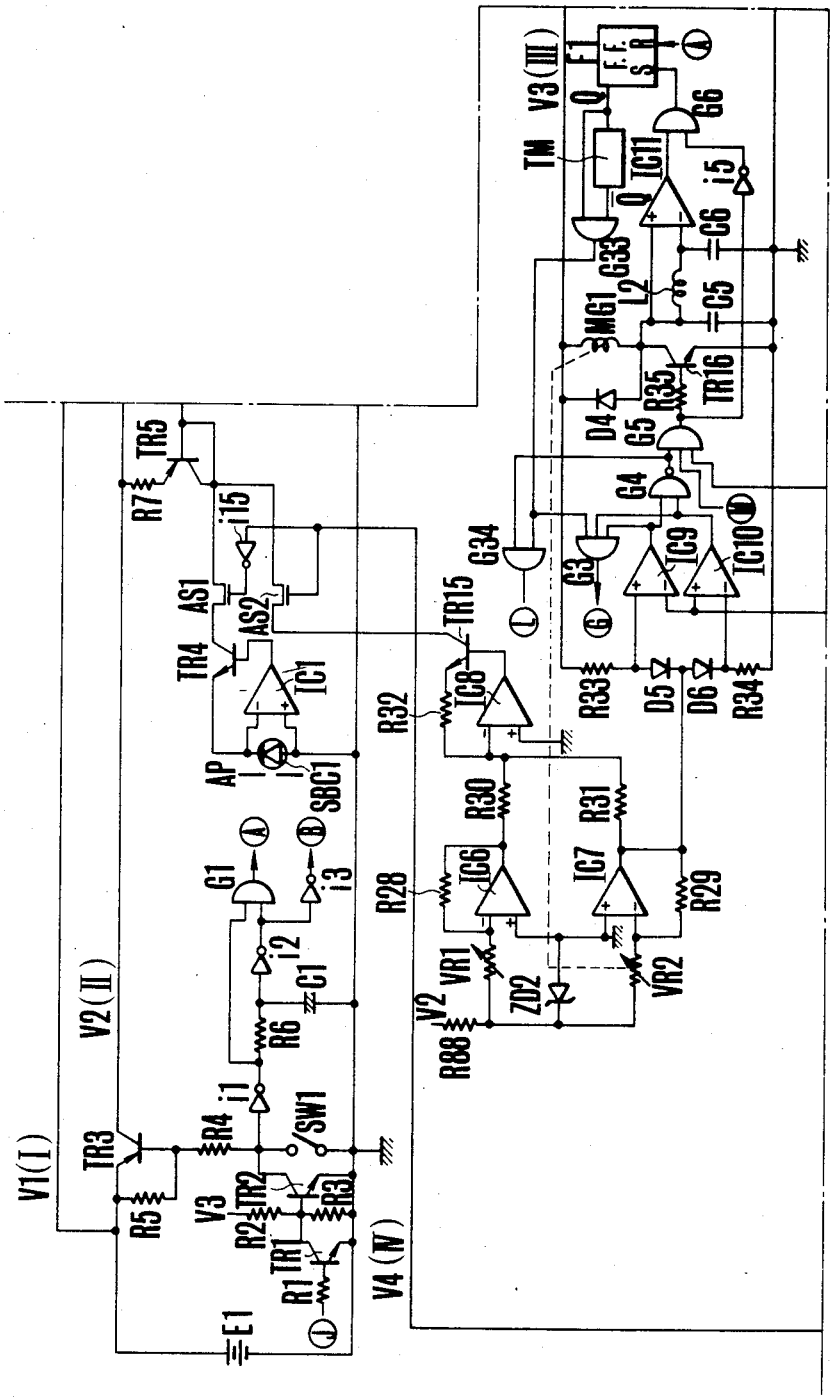
FIGS. 1(A), (B), (C), (D) and (E) show an embodiment of the control circuit to be applied to the photographing operation control device of the camera in accordance with the present invention, whereby

In FIG. 1(A), E1 is the power source while the voltage maintaining circuit is composed of the resistances R1–R3 and the transistors TR1, TR2 and TR3. SW1 is the first stroke switch to be closed when the shutter button is operated, while the reset circuit such as for counters and the start signal producing circuit for starting the distance measuring operation of the automatic focusing circuit, to be explained later, are composed of inverters i1, i2 and i3, the resistance R6, the condenser C1 and the gate G1. SBVC1 is the light sensing element such as a silicon photo-cell, AP is the subsidiary diaphragm for adjusting the light incident on the element and IC1 is the operational amplifier for constituting the light measuring circuit together with the transistors TR4 and TR5 and the resistance R7. VR1 is the variable resistance operatively engaged with the film sensitively setting dial while VR2 is the variable resistance operatively engaged with the distance ring, whereby the constant voltage circuit is composed of the resistances VR1 and VR2, the operational amplifiers IC6 and IC7, the Zener diode ZD2 and the resistances R28, R29 and R33. The operational amplifier IC8, the transistor TR15 and the resistances R30, R31 and R32 form an analog adding circuit. AS1 and AS2 are the analog switches while i15 is the inverter, whereby the switches AS1 and AS2 and the inverter i15 form a daylight-flash photographing mode change-over circuit. The diodes D5 and D6, the resistances R33 and R34 and the operational amplifiers IC9 and IC10 form a comparator, while the NAND gate G4, and AND gate G5, the resistance R35, the transistor TR16, the diode D4 and the magnet MG1 form the distance ring driving circuit. Further, the AND gate G6, the inverter i5, the condensers C5 and C6, the inductance L2 and the operational amplifier IC11 form a distance ring operation check circuit, while the flip-flop F1, the timer TM and the AND gates G33 and G34 form a distance mismeasuring detecting circuit. The AND gate G3 produces the distance finding operation completion signal.

Figure 1B:
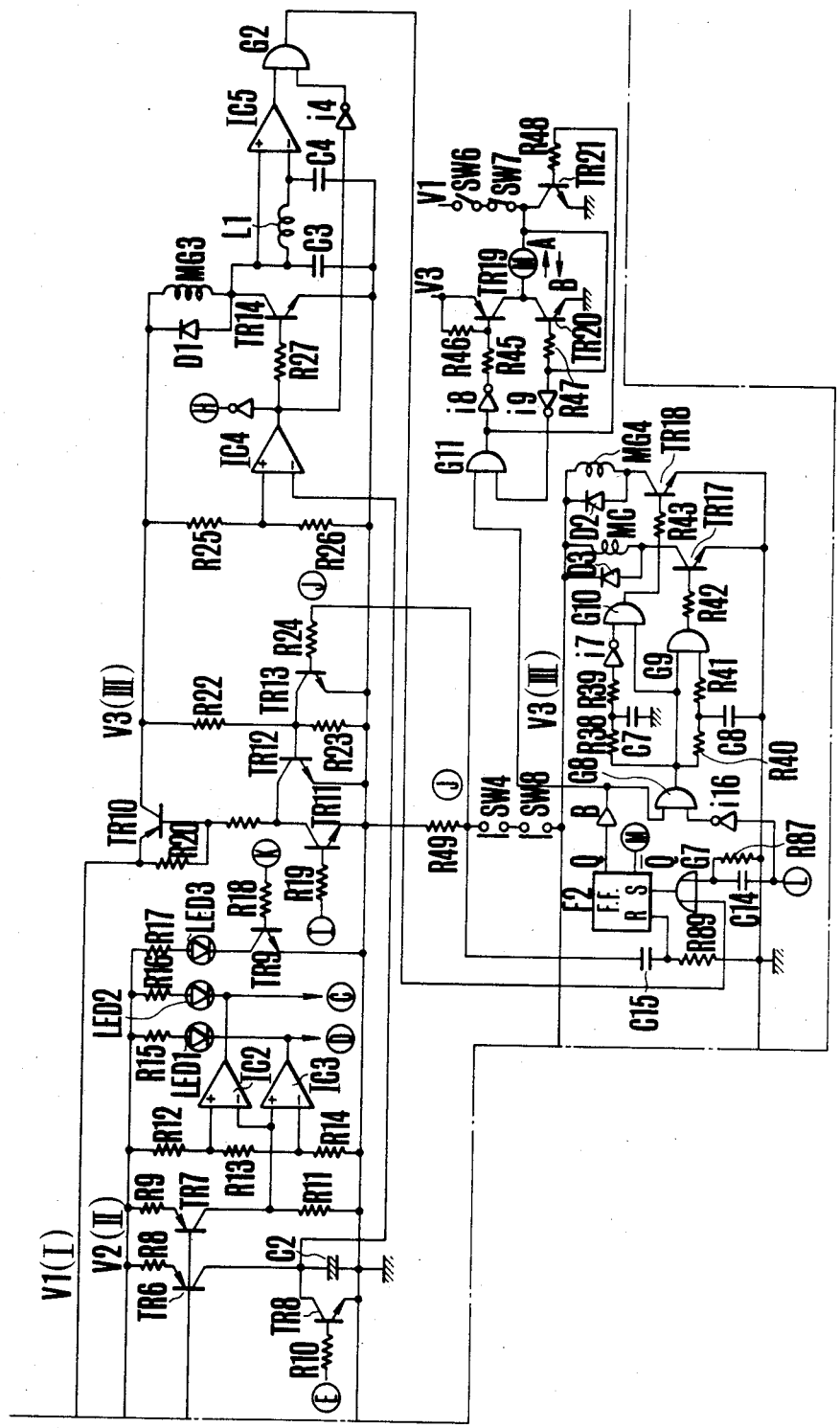
FIG. 1(F) is a drawing to show the connection relation of FIGS. 1(A)–(E)

In FIG. 1(B), the base of the transistor TR6 is connected to the base of the transistor TR5 shown in FIG. 1(A), to be applied with the output of the light measuring circuit. In FIG. 1(B), the transistors TR6 and TR8, the resistances R8, R10, R25 and R26, the condenser C2 and the operational amplifier IC4 form a timing circuit, while the resistance R27, the transistor TR14, the diode D1 and the magnet MG3 form a shutter closing driving circuit. The condensers C3 and C4 and the coil L1 function as a delay circuit, which includes a magnet operation check circuit together with the operation amplifier IC5, the inverter i4 and the gate G2. The transistor TR7, the resistances R9, R11–R16, the operational amplifiers IC2 and IC3 and the light emitting diodes LED1 and LED2 form a low brightness display circuit, while the transistors TR9, the resistances R17 and R18 and the LED3 form the focusing impossible display circuit. The voltage V1 is directly supplied from the power source E1 to the current supply line I, while the voltage V2 is supplied to the current supply line II through TR3. The circuit composed of the transistors TR10, TR11, TR12 and TR13 and the resistances R19–R24 is the second stroke voltage maintaining circuit which is closed with the second stroke of the shutter button, providing the voltage V3 to the current supply line III through the transistor TR10.

The circuit of flip-flop F2, the OR gate G7, the resistances R89 and R87 and the condensers C15 and C14 is for operating the motor M, the magnet clutch MC and the magnet MG4, which circuit constitutes the magnetic clutch driving circuit together with the inverter i16, the AND gates G8 and G9, the resistances R40–R42, the condenser C8, the transistor TR17, the diode D3 and the magnet clutch MC and the driving circuit for the magnet for releasing the sprocket holding lever together with the resistances R38, R39 and R43, the condenser C7, the inverter i17, the AND gate G10, the transistor TR18, the diode D2 and the magnet MG4. The circuit composed of the buffer B, the AND gate G11, the inverters i8 and i9, the resistances R45–R48, and the transistors TR19–21 is the driving circuit of the motor which feeds the film and charges the distance ring spring. The switch SW4 is to be closed with the film-feed completion, SW8 is to be closed with the distance ring spring charge, the SW6 is for starting the film rewinding and SW7 is the film rewinding completion switch.

FIG. 1(C) shows the distance sensor and the process circuit of the output of the distance sensor, whereby SBC2–SBC8 make a light sensing element group forming the second sensor unit, while SBC9–SBC11 make another light sensing element group forming the first sensor unit. IC12–IC21 are the operational amplifiers, which form the amplifier circuit for the first and the second sensor together with the resistances R56–R75. AS3–AS9 are the analog switches, which sequentially compare the analog amount from the first sensor with that from the second sensor by means of the signals from the decoders. The resistances R30 and R31, the diodes D9 and D10 and the operational amplifiers IC26–IC31 form the window comparator, while the AND gates G19–G22 and the shift registers SR1 and SR2 form the coincidence detecting circuit. CK1 is the clock oscillator, G18 is the AND gate and the counter CON1 is a binary counter including a 3 bit flip-flop. SW9 is the switch to be opened when the distance ring has arrived at the infinite distance from the very close distance, whereby the resistances R100 and R50, the condenser C16 and the diode D12 make a trigger circuit. F3 is a flip-flop to be set when the content of the counter CON1 becomes 3 and 7 by means of the detecting signal and the speed light mode and reset when the first stroke switch SW1 is closed. The flip-flop F4 is set when the distance measurement is impossible and reset when the first stroke switch SW1 is closed. The gates G14–G17 make a gate circuit for sending a signal to flip-flops F3 and F4 in accordance with the content of the counter I and the signal from the gate G19, while the AND gate G13 is an AND circuit for sending the ring drive start signal to the gate G5. The D-A converter D-A serves to convert the digital signal of the counter CON1 into an analog amount to be transmitted to the wind comparator.

Figure 1D:
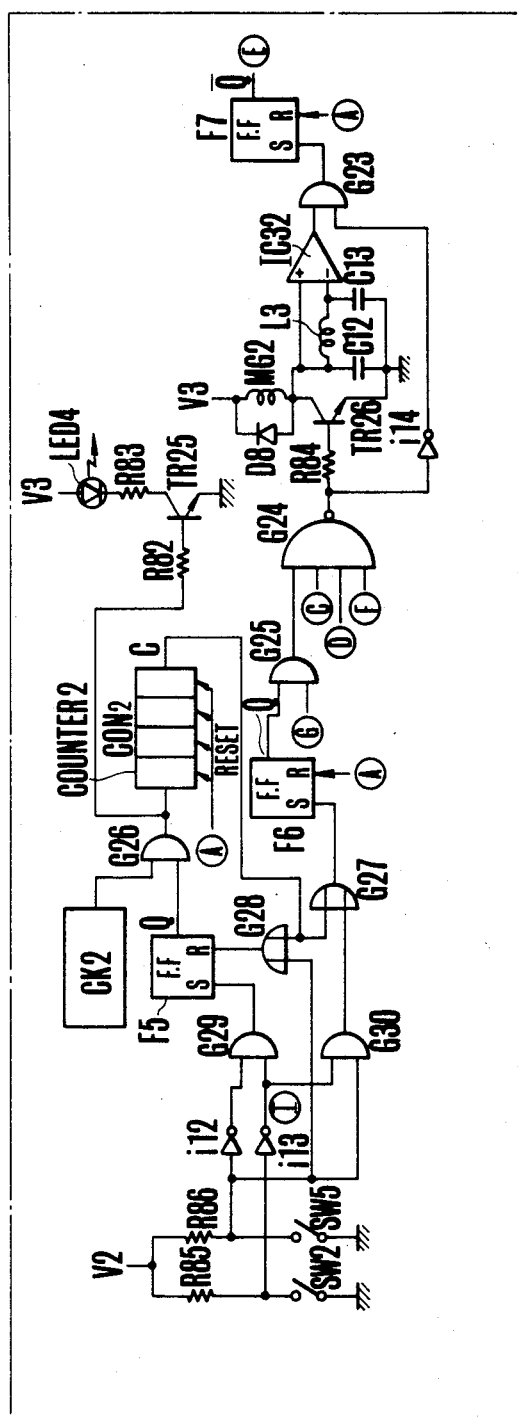

FIG. 1(D) shows the shutter opening control circuit and the self-timer circuit, whereby SW2 is the second stroke switch to be closed with the second stroke of the shutter button, while SW5 is the self-timer switch to be changed over when the mode is changed over into the self-timer mode. The resistances R85 and R86, the inverters i12 and i13, the OR gate G28 and the AND gate G29 form a circuit for sending the set signal to the flip-flop F5 when the second stroke switch SW2 is closed in the self-timer mode. CK2 is the clock oscillator for producing a pulse signal at every one second. Flip-flop F5 produces the gate control signal to transmit the clock signal from CK2 to the counter CON2, by opening and closing the AND gate G26. The counter CON2 is the decimal-into-binary counter, which produces the carry signal from the terminal when 10 is counted. The AND gate G30, the OR gate G27 and the flip-flop F6 form the shutter opening signal producing circuit, while the AND gates G23 and G25, the NAND gate G24, the resistance R34, the transistor TR26, the magnet MG2, the diode D8, the inverter i14, the condensers C12 and C13, the coil L3, the operational amplifier IC32 and the flip-flop F7 form the shutter opening driving circuit and the shutter closing operation detecting circuit. Further, the resistances R32 and R33, the transistor TR25 and the light emitting diode LED4 form the self-timer operation display circuit.

Figure 1E:
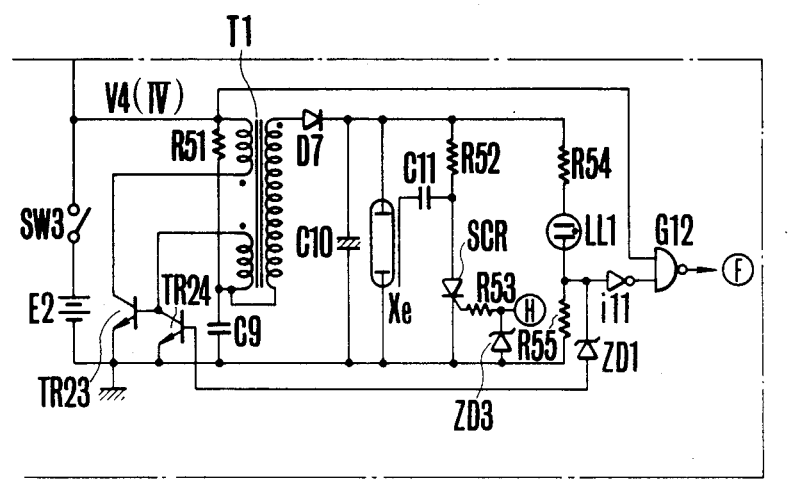
Figure 1F:
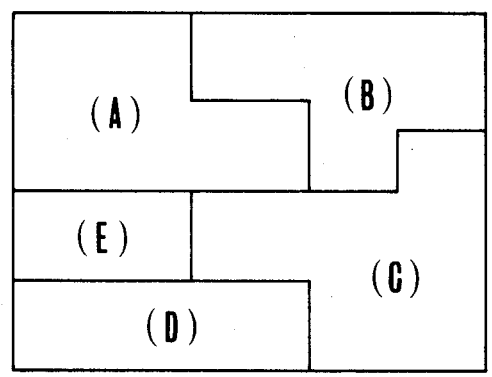

FIG. 1(E) shows the speed light device circuit of the conventional light adjusting speed light circuit. In the drawing, E2 is the power source for the speed light device, and SW3 is the switch to be closed in the speed light mode. The transistor TR23, the transformer T1, the resistance R51, and the condenser C9 constitute the oscillation circuit, while the transistor TR24 and the Zener diode ZD1 form the stop circuit for stopping the operation of the oscillation circuit when the output voltage of the main condenser C10 has reached a certain determined voltage. The diode D7 is a rectifier, C10 is the main capacitor and Xe is the flash discharge tube. The resistances R52 and R53, the condenser C11, the diode ZD3 and the thyrister SCR form the trigger circuit for the flash discharge tube Xe. LL1 is the neon discharge tube, which forms the speed light charge complete discharge circuit together with the resistances R54 and R55. The NAND gate G12 and the inverter i11 form the signal transmission circuit for transmitting the speed light charge incomplete signal to the gate G24 shown in FIG. 1(D). Thus, voltage V4 of the speed circuit is transmitted to the side of the camera to operate the analog switches AS1 and AS2 for changing over the daylight and the flash photographing mode shown in FIG. 1(A).

Figure 2A:
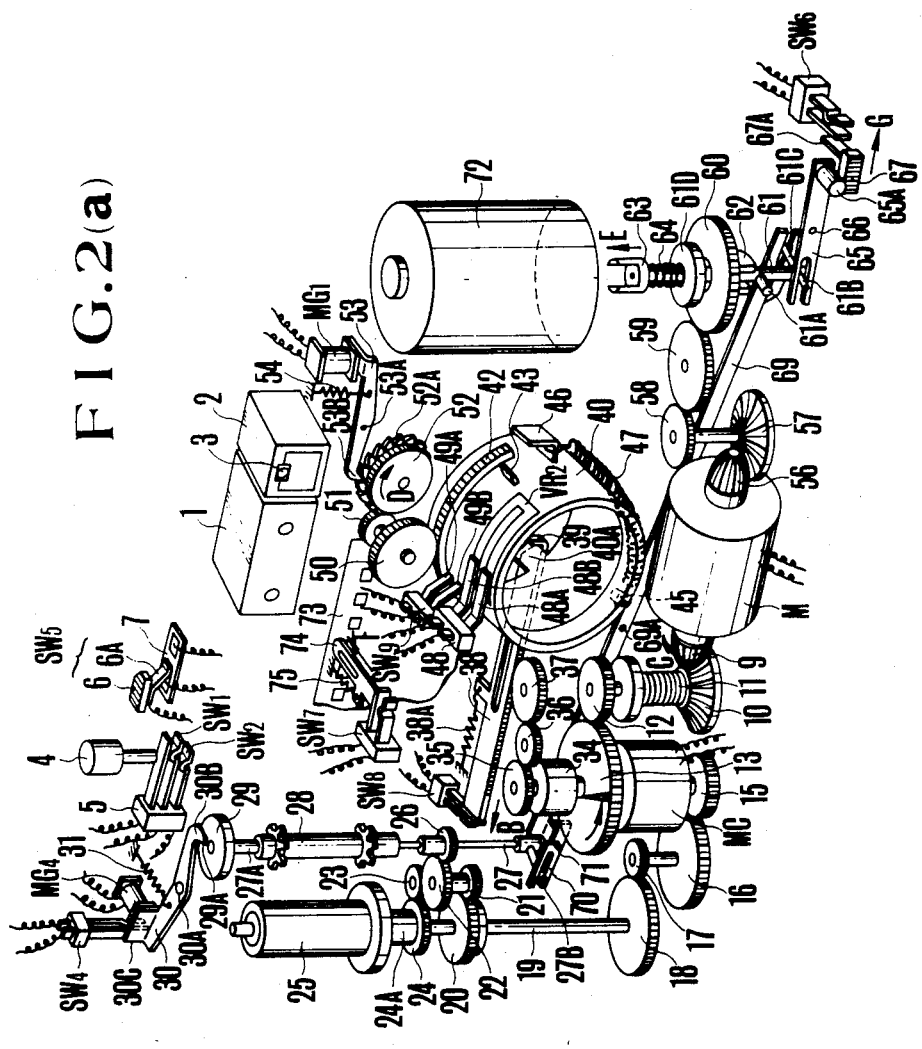
FIG. 2(a) shows the mechanism for constituting the camera together with the circuit shown in FIG. 1.
Figure 4:
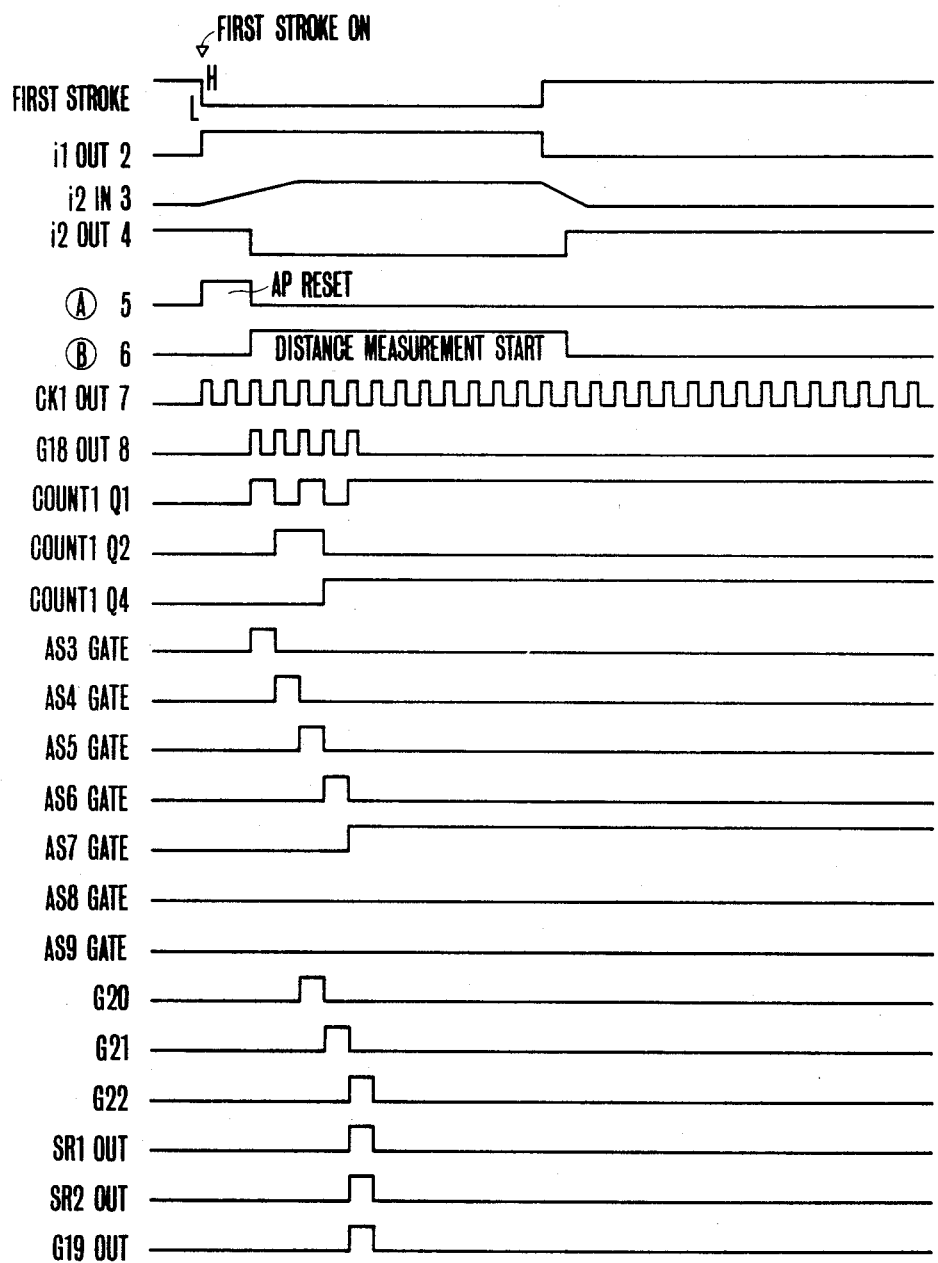
FIGS. 4 to 7, respectively, show the timing chart for explaining the operation of the photographing operation control device of the camera in accordance with the present invention.

FIG. 2(a) shows an embodiment of the mechanism including the camera together with the circuit shown in FIG. 1. In the drawing, 1 is the automatic focusing unit in which the distance measuring sensor and the process circuit of the output of the sensor shown in FIG. 1(C) are provided, 2 is the view finder system, 3 is the light emitting display device and 4 is the release button. Switch 5 is closed by means of the button 4. The switch 5 is divided into the switch SW1 to be operated with the first stroke and the switch SW2 to be operated with the second stroke. 6 is the operation member for operating the ordinary-self-timer photographing mode change-over switch SW5, on which member a contact 6A is provided. The switch SW5 is opened and closed when the contact 6A slidingly moves over the printed plate.

M is the driving motor, and a bevel gear 9 is provided on the output shaft of the motor M. A second bevel gear 10 and the spur-toothed gear 12 engaged with the bevel gear 9 are provided on the same shaft through a conventional slip mechanism 11. Between the spur-toothed gears 13 and 15 engaged with the gear 12, the aforementioned conventional magnetic clutch MC is provided. The spur-toothed gear 16 is engaged with the spur-toothed gear 15. On the same shaft as that of the gear 16, a spur-toothed gear 13 is provided to be engaged with the spur-toothed gear 18. 19 is the film wind-up shaft. The wind-up gear 20 drives the sprocket 28 and the spool 125 through the gears 21, 22, 23, 24 and 26. On the shaft 27, a disc 29 is secured, while the disc presents a notch 29A. 30 is the sprocket stop lever rotatably provided on the shaft 30A, having a claw 30B and the rising up part 30C and urged in the clockwise direction by means of the spring 31. The magnet MG4 is the one shown in FIG. 1(B) which includes a permanent magnet and normally attracts the lever 30 but releases it when a current is supplied to the magnet MG4. The aforementioned switch SW4 is provided at a position at which the switch SW4 is closed when the stop claw 30B of the lever 30 is engaged in the notch 29A of the disc 29.

34 is the one way clutch, through which the gears 35, 36 and 37 are provided, whereby the gear 37 is engaged with the lens charge rack 38. The rack 38 is slidably mounted on the camera body, having a rising up part 38. Further, the rack 38 is normally urged by means of a spring 38A.

40 has a helicoid, not shown in the drawing, being rotatably engaged into the helicoid (not shown) provided in the camera body to form a lens barrel 40. By rotating the lens barrel 40, the lens system is advance or withdrawn. Further, the lens barrel 40 includes a projection 40A to be engaged with the rising up part 39 of the above-mentioned rack 38 as is shown in the drawing. FIG. 2(a) shows the state in which the lens barrel is charged at the very close distance.

41 is the lens system. 42 is the gear secured on the lens barrel 40, being engaged with the gear 50.

43 is a conductor secured on the lens barrel 450, to short-circuit the contacts 49A and 49B of the switch SW9, while the switch SW8 is provided at the position at which the switch SW8 is closed when the rack has been charged. Switch SW8 is arranged to be closed when the lens barrel is rotated up to the very close distance at which the switch SW9 is arranged to be closed when the lens barrel is rotated up to infinite distance. VR2 is the resistance provided on the printed plate secured on the lens barrel 40. On the camera body, the terminal of the slide piece, having the contacts 48A and 48B which move slidingly on the resistance VR2 while exercising some pressure on the resistance, is secured.

45 is the pin provided on the lens barrel 40. A spring is provided between the pin 40 and the member 46 provided on the camera body. On the same shaft as that of the gear 50 engaged with the gear 42 on the lens barrel 40, a gear 51 is provided, while on the same shaft as that of the gear 52 engaged with the gear 51 a lever 53 and a gear 52A engaged with a conventional ratchet mechanism are provided.

The lever 53 is rotatably provided on the shaft 53A, being urged along the counter-clockwise direction by means of the spring 54. The other end of the lever 53 is in close contact with the magnet MG1 in such a manner that the lever 53 is rotated in the clockwise direction against the strength of the spring 54 when a current is supplied to the magnet MG1 while the lever 53 rotates by means of the spring 54 until the lever 53 is in close contact with the magnet MG1 when the current supply to the magnet has been interrupted.

56 is the bevel gear mounted on the output shaft of the motor M. The bevel gear 56 is engaged with the second bevel gear 57. The wind-up mechanism is driven by means of the bevel gear 57, the gears 58, 59 and 60. 61 is the rewinding shaft, while 62 is the engaging member presenting a notch, at the other end of which member a gear 60 is secured. The pin 61 is provided on the shaft 61 to be engageable with the engaging part 62.

63 is the engaging member to be engaged with the shaft of the patrone to rewind the film, being arranged in such a manner that the member is moved upwards by means of the spring so as to be engaged with the patrone. The engaging member 63 is secured on the shaft 61, presenting the pins 61A, 61B, 61C and the disc 61D and operating upwards and downwards along with the displacement of the engaging member 63.

65 is the lower lever being rotatably borne by the shaft 66 and having a notch to be engaged with the pin 61B and a knob 65A.

67 is the rewinding knob, mounted to be slidable to the right and the left and having a lever 67A.

The switch SW6 is closed when the knob 67 is displaced to the right by means of the lever 67A.

69 is the lever, having a groove in which the pin 61C is engaged and a bent part which engages with the lever 70 and rotatably borne on the shaft 69A. The lever 70 has a groove in which the pin 27B is engaged and is rotatably borne with the shaft 71.

73 is the film, while 74 is the film sensing lever, which is placed between the external rail and the perforations of the film to be perpendicular to the film surface but a little deviated from the position of the pressure plate. The lever 74 is urged toward the film surface by means of the spring 75. The switch SW4 is opened or closed by means of the lever 74.

FIG. 2(b) shows an embodiment of the shutter mechanism to be applied to the present invention. In the drawing, 100 and 101 are the shutter blades, which respectively include the openings 102 and 103 for determining the aperture. 104 is the holding lever rotatably borne in the camera body by means of the shaft 104d. The lever is engaged with the blade 100 by means of the shaft 104b and the blade 101 by means of the shaft 104c. Further, 104a is the bent part provided at the end of the lever 104, normally being attracted by means of the magnet MG2 against the strength of the spring 105.

When the magnet MG2 is brought into the non-excited state, the lever 104 is rotated in the clockwise direction around the shaft 104d to displace the shutter blades 102 and 103 in the direction of the arrows respectively, whereby the openings 102 and 103 overlap one another to form the aperture opening. 107 is the shutter closing lever having a bent part 107c at the one end and normally attracted by means of the magnet MG3. 107a is the bent part provided at the other end of the lever 107, being engaged with the projecting part 106b of the slide plate 106. The slide plate 106 is urged in the direction of the arrow by means of the strength of the spring 109 so that when the lever 107 is rotated in the clockwise direction around the shaft 107b to disengage the bent part 107a from the projecting part 106b, the slide plate 106 is displaced in the direction of the arrow. 106a is the bent part provided at the end of the slide plate 106, being in contact with the lower 104 so as to rotate the lever 104 in the counter-clockwise direction in order to close the shutter along with the displacement of the slide plate 106 in the direction of the arrow.

Below, the operation of the circuit shown in FIG. 1 will be explained in accordance with the timing charts shown in FIGS. 4 to 7.

When the shutter button 4 in FIG. 2(a) is actuated to carry out the first stroke operation, the first stroke switch SW1 is closed. Thus, the potential at the base of the transistor TR3 becomes low due to the resistance R4, whereby the transistor TR3 is brought into the conductive state. This is done in such a manner that the voltage V2 is supplied to the current supply line II through the transistor TR3 from the power source E1.

When the switch SW1 is closed, the inverter i1 produces the output "1" in such a manner that the condenser C1 starts to be charged in accordance with the time constant R6·C1. As soon as the voltage of C1 has become higher than VTH (Threshold Voltage) of the inverter i2, the level of the output of i2 becomes "0" so that the level of the output signal of the AND gate G1 becomes "1" during the interval in accordance with the time constant R6·C1. Because the output terminal of the gate G1 is connected to the reset terminal of the counter CON1 in the automatic focusing circuit, the counter CON1 is reset at the time of the first stroke operation in such a manner that the automatic focusing operation is ready for starting. Further, the inverter i3 is connected to the inverter i2, so that the level of the output of the inverter i3 becomes "1" delayed by the time in accordace with the time constant of R6·C1, which output is transmitted to the input terminal of the AND gate G18 to start the distance measuring operation. Further, when the switch SW1 is closed, the voltage V2 is applied to the light measuring circuit in FIG. 1(B), as is explained above, so that the light measuring circuit is actuated to start the light measuring operation. Consequently, a current in accordance with the brightness of the object incident on the light sensing element SBC1 flows through the resistance R7, the transistor TR5 and the analog switch AS1, TR4 and SBC1 and also through the transistors TR6 and TR7 shown in FIG. 1(B).

This current flows through the resistance R11, in which a voltage drop takes place in such a manner that it is determined from the voltage drop whether the brightness is too low, proper or too high. That is, in the case when the brightness of the object is too low, the voltage drop taking place in the resistance R11 is small, so that the potential at the positive terminal of the comparator IC3 becomes lower than that at the negative terminal, whereby the level of the output of the comparator IC3 becomes "0", to light up the light emitting diode LED1, which is the low brightness display.

Further, when the brightness of the object is too high, the potential at the positive terminal of the comparator IC2 becomes lower than that at the negative terminal so that the level of the output of IC2 becomes "0" to light up the light emitting diode LED2, which is the high brightness display. Further, the outputs (C) and (D) of IC2 and IC3 are applied to the input terminal to AND gate G23 in FIG. 1(D) in such a manner that in the case of the low or the high brightness, the gate G24 is closed to prohibit the operation of the shutter opening driving circuit and the photographing operation.

Further, when the proper exposure occurs, the potential at the positive input terminals of both of the comparators IC2 and IC3 is higher than that at the negative input terminals so that the level at the output terminals of the comparators IC2 and IC3 becomes "1" and the light emitting diodes LED1 and LED2 are put out while at the same time the level at the input terminals (C) and (D) of the gate G24 is "1". Thus, only at the time of exposure is the shutter driving circuit ready for operation subject to other conditions. In this way, the light measuring circuit starts to operate along with the first stroke to carry out the brightness determining operation, while the distance measuring operation is started as explained above. That is, as explained above, the counter CON1 is reset by means of the first stroke operation and a "1" is applied to the one input terminal of the AND gate G18 through the inverter i3, while at the same time of the closing of the first stroke switch SW1, the clock oscillator CK1 is started. Further, because the output of the gate G1 in FIG. 1(A) is connected to the reset terminal R of the flip-flops R3 and F4, the flip-flops F3 and F4 have been reset by means of the output of the Gate G1. Thus, a "1" is produced from the $\bar{Q}$ terminal of the flip-flop F3, whereby the output start signal (B) of i3 in FIG. 1(A) became "1", as explained above, to open the gate G18. Thus, the counter CON1 starts binary counting by means of the clock signal of CK1. The value counted by means of the counter is decoded by means of the decoder DCC1 to open and close the analog switch AS3–AS9 in sequence and scan the sensors SBC2–SBC8 in such a manner that the position of the object image formed on the second sensor part is detected to detect the object distance.

The automatic focusing circuit in the present embodiment is constructed, as shown in FIG. 3, in such a manner that, in front of the first sensor part, a lens Ln1 is provided, while in front of the second sensor part, a lens Ln2 is provided. This is done in such a manner that the position of the object image formed on the second sensor part is determined by means of the object distance, whereby the object distance is obtained from the sensor position of the second part when the output of the first sensor part coincides with that of the second sensor part while the output of the first sensor part is compared with that of the second sensor part. Assume, for example, that the object is located at the distance D. The image of the object O' is projected on the sensors SBC4, SBC5 and SBC6. Thus, in this case, the output of the sensors SBC9, SBC10 and SBC11 coincide respectively with that of the sensors SBC4, SBC5 and SBC6. Thus, as explained above, the counter CON1 starts counting in such a manner that when the counter CON1 has counted, one pulse "1" is delivered from the Q output terminal of the counter CON1 Q1, whereby the switch AS3 is closed by means of the output of the decoder. Thus, the output of the sensor SBC2 is delivered to the switch AS3 in such a manner that the output of the sensor SBC2 is compared with that of the sensor SBC1 by means of the first wind comparator (resistances R80, R81, diodes D9, D10, operational amplifiers IC26, IC27). When, at this time, both of the outputs coincide with each other, the level of the gate G20 becomes "1". When they do not coincide with each other, the level becomes "0". Further, the output of the light sensing element SBC10 of the first sensor part amplifier by means of the operational amplifier IC20 is compared with that of the light sensing element SB2 of the second sensor part by means of the second wind comparator (operational amplifiers IC2, IC28 and IC29) in such a manner that when both outputs coincide with each other, the level of the output of the gate G21 becomes "1", while, when both outputs do not coincide with each other, the level becomes "0".

Further, the output of the light sensing element SBC11 of the first sensor part amplified by means of the operational amplifier IC21 is compared with the third wind comparator (operational amplifiers IC30 and IC31) in such a manner that, in the case of coincidence, the level of the output of G22 is "1", while otherwise the level of the output of G22 is "0".

As explained above, the output of the sensor SBC9, SBC10 and SBC11 now coincide respectively with that of the sensor SBC4, SBC5 and SBC6, so that when the value counted by means of the counter CON1 is "1", each of the AND gates G20–G22 delivers a "0" output.

When, in this way, the output of the sensor SBC2 has been detected, the counter CON1 starts to count, whereby the value counted by means of the counter CON2 becomes "2" to close the switch AS4 and carry out the detection of the output of the sensor SBC3 by means of the above-mentioned operation.

After that, every time the value counted by means of the counter CON1 is advanced step by step, the output of the sensors SBC2–SBC8 is detected in sequence. When the value counted by means of the counter CON1 reaches "3" to carry out the detecting operation of the output of the sensor SBC4 while the output of each sensor is detected, the output of the second sensor part SBC4 is compared with that of the first sensor part SBC9 by means of the first wind comparator. Because, as explained above, the output of the sensor SBC4 is equal to that of the sensor SBC9, the level of the output of the gate G20 is "1", while because the output of the first sensors SBC10 and SBC11 is not equal to that of the second sensor SBC4, the level of the output of the gates G21 and G22 is "0".

Thus, a pulse is delivered to the counter CON1 from the oscillator CK1 so that the value counted by means of the counter CON1 becomes "4", when, at the same time, the above pulse is applied to the registers SR1 and SR2 so that a "1" level of the output of the gate 20 is delivered to the shift register SR1 in such a manner that a "1" is set at the first bit of the shift register SR1. Thus, the fact that the output of the sensor SBC9 corresponds with that of the sensor SBC4 is memorized in the first bit of the shift register SR1. Further, at the same time, as explained above, the value "3" counted by means of the counter CON1 is changed into "4" so that the switch AS6 is closed to start the detecting operation of the sensor SBC5. As explained above, the output of the sensor SBC5 is equal to that of the sensor SBC10 and, along with the detecting operation of the sensor SBC6, the level of the output of the gate G21 is "1", while that of the gates G20 and G22 is "0". In the same way as in the above-mentioned case, a pulse from the oscillator CK1 is delivered to the counter CON1 in such a manner that the value counted by means of the counter CON1 becomes "5" when, at the same time, a shift pulse is delivered to the shift registers SR1 and SR2 in such a manner that a "1", the output of the gate G21, is delivered to the shift register SR2, while a "1" memorized in the first bit of SR1 is caused to be memorized in the second bit. In this way, the fact that the output of the sensor SBC9 is equal to that of the sensor SBC4, is memorized as "1" in the second bit of the shift register SR1, while in the shift register SR2, the fact that the output of the sensor SBC10 is equal to that of the sensor SBC5, is memorized as "1". The detection result of the sensor SBC5 is registered in the shift register in this way, while the value counted by the counter CON1 becomes "5" as mentioned above, so that the switch AS7 is closed in such a manner that the sensor SBC6 starts the detection operation. As mentioned above, the output of the sensor SBC6 is equal to the output of the sensor SBC11 so that after the detection operation of the sensor SBC6, the gate G22 produces an output with a "1" level while the gates G20 and G21 produce an output with a "0" level. Thus, only when the output of the sensor SBC6 is detected, a "1" level is applied to all input terminals of the AND gate G19 to display that the state of the image formed on the second sensor has been detected, whereby the gate G19 delivers a "1" level signal. That is, the "1" level memorized in the second bit of the shift register SR1 means that the last but one result detected by the sensor is equal to the output of the sensor SBC10, while a "1" from the gate G22 means that the current result detected by means of the sensor is equal to the output of the sensor SBC11, so that the "1" signal is delivered only when the three sensors on which the image of the object is formed have been detected. This means that the position of the sensor on which the image of the object is formed is confirmed. Further, the value then counted by means of the counter CON1 corresponds to the position of the sensor then detected, so that the position of the sensor on which the image of the object is formed, that is, the object distance is memorized as the value counted by means of the counter CON1, whereby the detecting operation of the object distance is completed. When the detecting operation of the object distance has been completed in this way, the "1" signal is transmitted from the gate G19 to the flip-flop F3 through the "OR" gate G14 to set F3. Consequently, the $\bar{Q}$ output terminal of F2 delivers a "0" signal to close the AND gate G18 in such a manner that the count operation of the counter CON1 is terminated and the distance information memorized in the counter CON1 is maintained. When the shutter button is further pushed down after the light measuring and the distance measuring operation have been carried out with the first stroke of the release, the second stroke switch SW2 in FIG. 1(D) is closed, whereby the level of the output (I) of the inverter i13 becomes "1". Further, the transistor TR11 in FIG. 1(B) is brought into the closed state in such a manner that TR10 becomes conductive to supply a voltage V3 to the current supply circuit III.

The voltage V3 is divided by means of the resistances R22 and R23 to bring the transistor TR12 in order to maintain the voltage and further divided by means of the resistances R2 and R3 to bring the transistor TR2 in order to maintain the voltage V2.

That is, by means of the second stroke of the release, the voltages V2 and V3 are maintained in such a manner that even if the release button is released after the second stroke, all the circuits are maintained in the supplied state with current by means of the self voltage holding operation.

When the voltage V3 is supplied to the current supply circuit in this way, a current flows through the distance ring driving magnet MG1 to drive the distance ring. That is, when the distance measuring operation has been completed, as mentioned above, the flip-flop F3 is set so that the Q output terminal delivers a "1" signal, while the F4 has then been reset to $\bar{Q}$ output terminal is delivering the "1" signal. Thus, the AND gate G13 then delivers the "1" signal, while the switches SW4 and SW8 are in the closed state to reset the flip-flop F2 in such a manner that the $\bar{Q}$ output terminal delivers the "1" signal. At this time, the NAND gate G4 also delivers the "1" signal so that the AND gate G5 delivers the "1" signal. Consequently, when the voltage V3 is supplied, the transistor TR1 is brought into the switched-on state to supply current to the magnet MG1 in such a manner that the lever shown in FIG. 2 is rotated in the clockwise direction against the strength of the spring 54.

In this way, the ratchet gear 52A is disengaged from the claw part 53A of the lever 53. Thus, the lens barrel 40 engaged with the ratchet gear 52A through the gears 50, 51 and 52 is disengaged so as to be freely rotatable. The lens barrel is rotated in the counter-clockwise direction by means of the spring (shown in the charged state in the drawing) arranged between the pin 45 and the camera body 46 in such a manner that the lens barrel is displaced from the position corresponding to the very close distance toward the position corresponding to the infinite direction, whereby the contacts 48A and 48B move slidingly over the resistance VR2 secured on the lens barrel 40 in such a manner that the value of the resistance VR2 gradually alters in accordance with the distance value set on the lens barrel. The alteration of the value of the resistance is represented as the alteration of the output of the amplifier IC7 so that the voltage corresponding to the value of the object distance set on the lens barrel is applied to the positive and the negative input terminal of the comparators IC9 and IC10. Further, a voltage memorized in the counter CON1 and corresponding to the object distance information is applied to the other input terminals of the comparators IC9 and IC10 through the digital-to-analog converter D-A so that the detected object distance value is compared with the object distance value actually set on the lens barrel by means of the comparators IC9 and IC10. Thus, when the object distance value set on the lens barrel coincide with the object distance value memorized in the counter CON1, both of the comparators IC9 and IC10 deliver the "1" signal, while the level of the output of the NAND gate G4 becomes "0". In particular, the distance value set on the lens barrel coincides with the distance value detected during the above-mentioned distance measuring operation, the AND gate G5 delivers a "0" signal to bring the transistor TR16 into the opened state in order to interrupt the current supply to the magnet MG1, whereby the lever 53 is engaged with the gear 52A by means of the spring 54 to stop the rotation of the lens barrel 40, and the distance measuring operation is completed.

Figure 5:
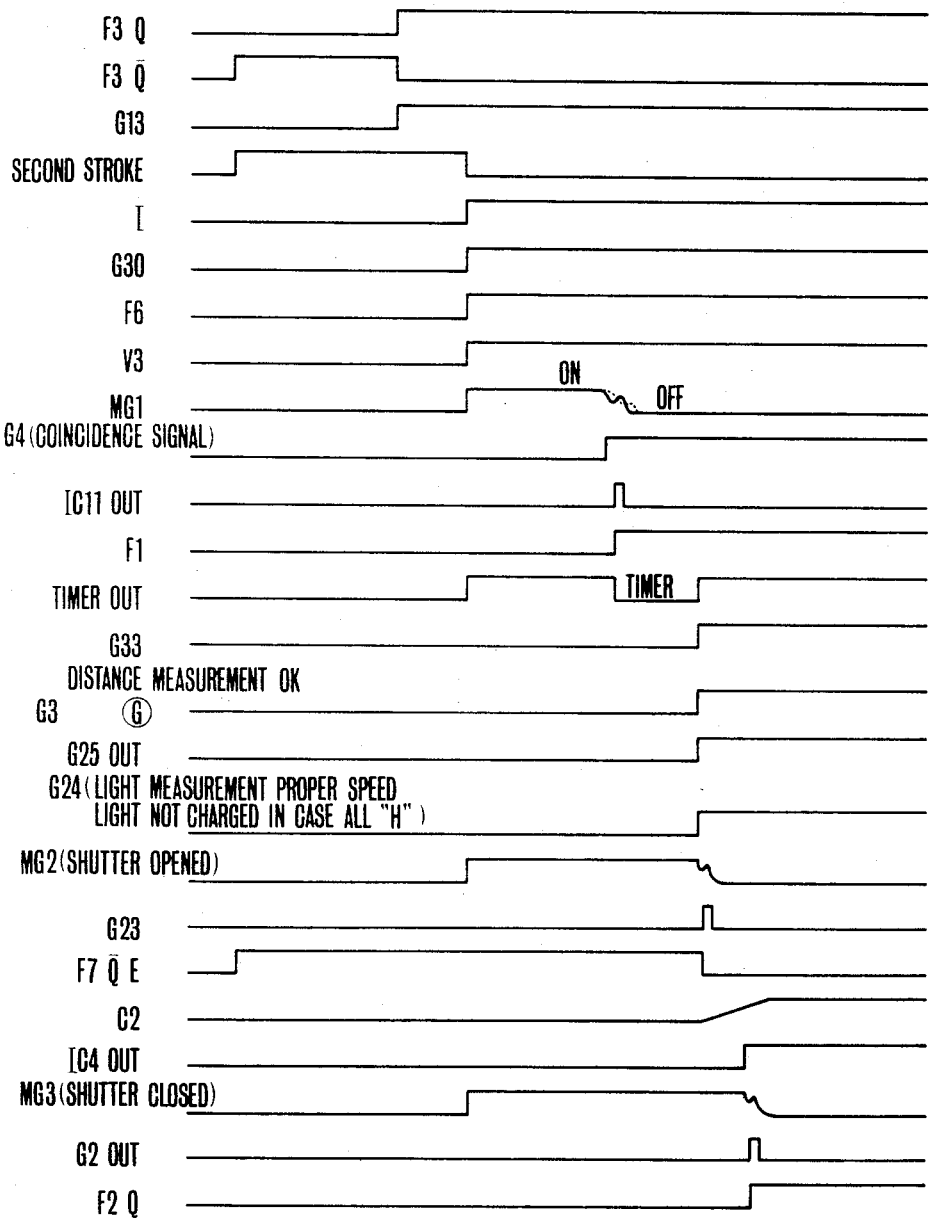
Figure 6:
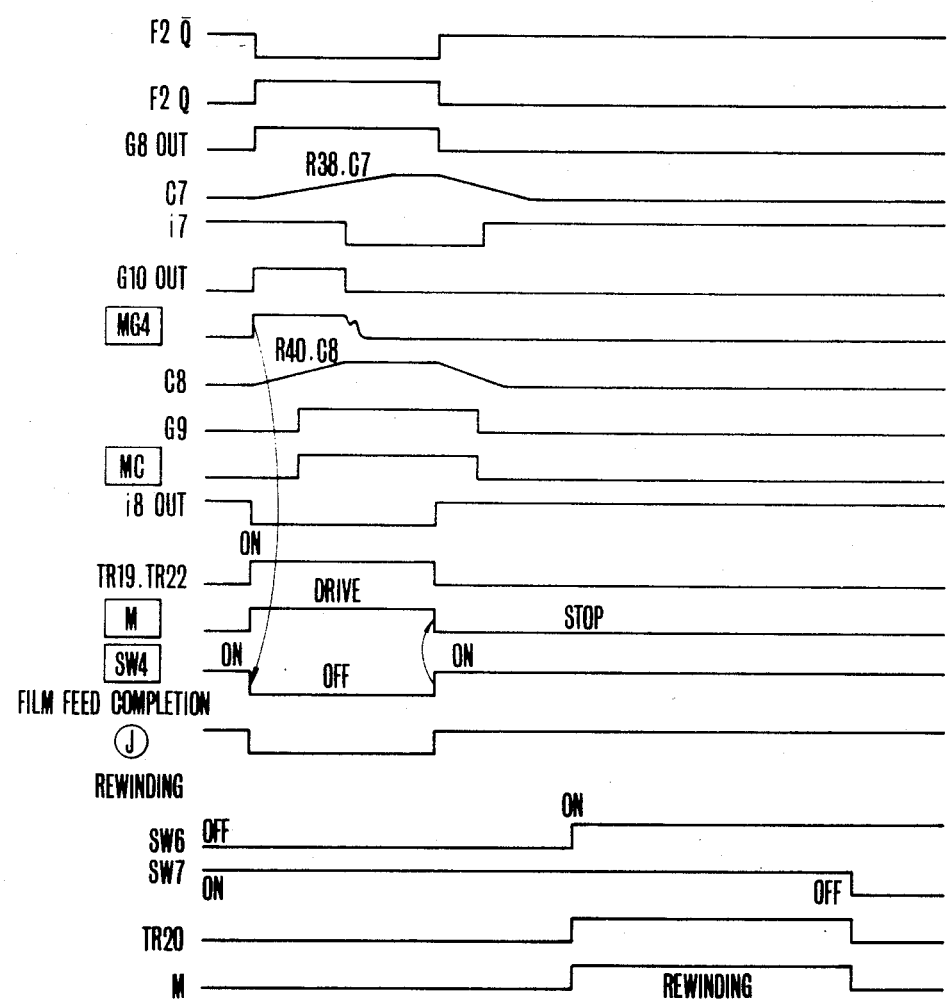
Figure 7:
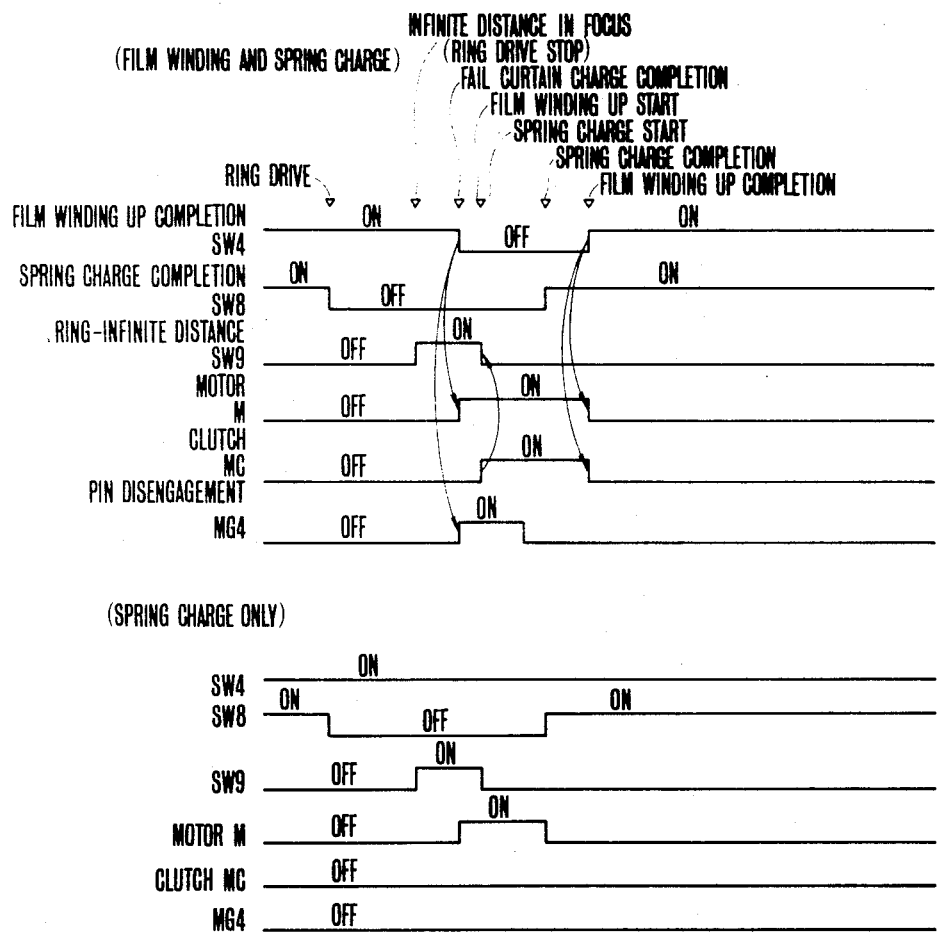

As mentioned above, the magnetic force changes at the moment at which the iron piece of the lever 53 is disengaged when the current supply to the magnet MG1 is interrupted, so that the voltage at the collector of the transistor TR16 assumes a hump-shaped wave form (MG1 in FIG. 5). Consequently, the signal of MG1 is delivered to the negative input terminal of the comparator IC11 through the delay circuit composed of the condensers C5 and C6, being delayed as shown at MG1 in FIG. 5, to be compared with the collector voltage of the transistor TR16 directly delivered to the positive input terminal of the comparator in such a manner that the level of the output of the comparator IC11 becomes "1" for a moment. Consequently, when the lever 53 operates to stop the rotation of the lens barrel and terminate the distance measuring operation, the flip-flop F1 is set by means of the "1" signal, the output of the comparator IC11, the timer TM starts to operate by means of the Q output of the flip-flop F1 and the AND gate G33 delivers, being delayed by means of the timer TM, by means of the "1" signal from the $\bar{Q}$ output terminal of the flip-flop F1 and the $\bar{Q}$ output of the timer TM a "1" output to be delivered to the input terminal of the AND gate G3.

Consequently, when after the lapse of the time determined by means of the timer TM after the "0" signal has been delivered from the gate G5, both of the comparators IC9 and IC10 deliver the "1" signal and then the value at the distance ring set in the resistance VR2 coincides with the distance information detected by means of the distance detecting operation, that is, the distance measurement is carried out correctly and the distance ring holds the set value, the AND gate G3 delivers a "1" as a release signal to be delivered to the negative input terminal of the AND gate G25. Further, the other input terminal of the gate G25 is connected to the Q output of the flip-flop F6, whereby the flip-flop F6 has been set by means of the "1" signal applied to F6 through the gates G30 and G27 so that the AND gate G25 delivers the "1" signal. The output terminal of the gate G25 is connected to the negative input terminal of the NAND gate G24, whereby a "1" is, as mentioned above, delivered to the other input terminals (C) and (D) of the gate when the result of the measurement is within the proper range of the brightness, while the output of the NAND gate G12 is delivered to the input terminal F of the gate G24, whereby the gate G12 delivers a "1" in the ordinary photographing mode, so that the gate G24 delivers the "0" signal in response to the output of the gate G25. Consequently, so far as the brightness is proper, the distance measurement operation has been completed and the mode is the ordinary photographing mode, the gate G25 delivers a "0" so as to bring the transistor TR26 into the opened state and release the shutter opening magnet MG2 in such a manner that the holding of the shutter in the closed state is released so as to start the exposure. Further, when the magnet MG2 is brought into the non-excited state so as to cause an alteration of the magnetic force, a hump-shaped wave takes place at the collector of the transistor TR26 so as to be transmitted to the positive terminal of the comparator IC32, whereby the wave form transmitted to the positive terminal is compared with the delayed wave form supplied through the condensers C12 and C13 and the coil L3 by means of the comparator IC32. Accordingly, a single pulse "1" signal is delivered to the flip-flop F7 through the AND gate G23 in order to set the flip-flop F7. Consequently, F7 delivers the "0" signal from the $\bar{Q}$ output terminal to bring the transistor TR8 as a count switch into the opened state, whereby the condenser C2 starts to be charged while the shutter starts to be controlled in synchronism with the shutter opening. The condenser C2 is connected to the collector of the transistor TR6, while the value of the current flowing through the transistor TR6 corresponds to the output of the above-mentioned light measuring circuit, so that the charging speed of the condenser depends upon the object brightness. When, in this way, the terminal voltage of the condenser C2 has reached a standard voltage determined by means of the resistances R25 and R26 after the lapse of a certain time determined by means of the object brightness, the level of the output of the comparator IC4 becomes "0" to bring the transistor TR14 into the opened state in such a manner that the magnet MG3 is brought into the non-excited state to close the shutter curtain in order to terminate the exposure. When, on the other hand, the output of the comparator IC4 becomes "0" at the termination of the exposure, the "1" signal is applied to the one input terminal of the AND gate G2, while in the same way as in the case of the above-mentioned magnet MG1, a hump-shaped wave form takes place in the collector of the transistor TR14, whereby the wave form is compared with a delayed hump-shaped wave form from the delay circuit consisting of the condensers G3 and G4 and the coil L1 by means of the comparator IC5 to produce a single pulse "1" signal. Thus, the pulse from the AND gate G2 is transmitted to the flip-flop F2 through the OR gate G7 to set the flip-flop F2. Thus, from the Q output of the flip-flop F2, a "1" is produced to be transmitted to the other input terminals of the AND gates G8 and G11 through the buffer amplifier B. The other input terminal of the NAND gate G8 is connected to the output terminal of the gate G34 through the inverter i16, whereby the gate G34 delivers the "0" level signal at the termination of the distance measuring operation so that the AND gate G8 delivers the "1" signal by means of the "1" signal from the Q terminal of the flip-flop F2. The "1" signal from the gate G8 is delivered to the condenser C7 through the resistance R38 to charge the condenser C7 until the charge voltage reaches the threshold level of the inverter i7 after a certain determined time, when the output of the inverter i7 is inverted. Thus, the output of the AND gate G10 retains a "1" condition during a certain time determined by R38 and C7 since the gate G8 delivered a "1", to bring the transistor TR18 in the closed state in such a manner that a current is supplied to the magnet MG4 for a certain determined time. Thus, at the same time when the sprocket stop lever 30 has been rotated in the counter-clockwise direction to disengage the sprocket, the switch SW4 is opened. Further, the "1" signal from the gate G8 is delivered to the condenser C8 through the resistance R40, while the gate G9 produces the "1" output after a certain determined time after the gate G8 delivered a "1" to bring the transistor TR17 into the closed state and actuate the magnet MG. Thus, since the time constant of the resistance R40 and the condenser C8 is larger than the time constant of R38 and C7, the magnet MG operates only after the sprocket has been disengaged as explained above. The sprocket is disengaged in this way, while the "1" signal is applied to the one input terminal of the gate G11 through the buffer amplifier B, so that also the gate G11 produces a "1" signal to bring the transistor TR21 into the closed state and at the same time transmit the "0" signal to the transistor TR19 through the inverter i8 to bring the transistor TR19 into the closed state. Thus, concurrently with the disengagement of the sprocket, a current flows through the motor M in the direction of the arrow in such a manner that the motor M starts to rotate in the forward direction. That is, the motor M starts to rotate in the direction of C in FIG. 2 after the shutter closing. Further, after the lapse of a certain determined time after the motor M has started to rotate in this way, the magnet MC operates to actuate the magnet clutch MC as mentioned above and, along with the rotation of the motor M, the gear 15 starts to rotate to drive the sprocket and the spool in order to carry out the film wind-up operation. Besides, the above-mentioned film wind-up operation, the gear 13 is rotated in the direction of A, whereby the rotation of the gear 13 is transmitted to the gear 35 through the clutch 34 to rotate the gears 35, 36 and 37 in such a manner that along with the rotation of the gear 37, the rack is displaced in the direction of B. Thus, the rising up part 39 of the rack 38 pulls the projecting part 40A of the lens barrel 40 to rotate the lens barrel 40, in the clockwise direction in such a manner that the spring 47 is charged while the spring of the distance ring is also charged.

The film feeding operation is carried out in this way, while the film is fed by one frame (eight perforations), the sprocket carries out out rotation, whereby the claw 30B of the sprocket stop lever 30 is engaged into the notch 39A of the disc 29 to stop the sprocket and terminate the film feeding operation by one frame. At the same time, the lever claw 30B is engaged in the notch 29A after the termination of the film feeding by one frame, the rising up part 30C of the lever 30 is attracted by means of the magnet MG4 to close the switch SW4. Further, as mentioned above, when the spring of the distance ring has been charged, the end surface of the lever 38 pushes the switch SW8 to close the switch SW8. Thus, when the film has been fed while the spring has been charged, a voltage V3 is applied to the condenser C15 and the resistance R89 through the switch SW8 and SW4 to apply a single pulse to the reset terminal R of the flip-flop F2 and reset the flip-flop. That is, when the film has been fed while the spring of the distance ring has been charged, the Q output of the flip-flop F2 delivers a "0" signal, while the gate G11 delivers "0". Thus, the transistors TR21 and TR19 are brought into the opened state to interrupt the current supplied to the motor M and stop the motor. Further, because the gates G8 and G9 deliver the "0" signal, while the transistor TR17 is brought into the opened state, the magnet clutch MC is also brought into the non-operable state in such a manner that the whole photographing sequence is terminated. Further, unless all the input signals to the NAND gate G24 are "1", the shutter release operation cannot be carried out due to the above-mentioned operation process, so that the photographing operation is prohibited when the result of the light measuring process does not show the proper brightness or the distance is not measured properly.

Below, the case when the distance measurement operation is not carried out properly will be explained. Normally, while during the distance measurement operation the distance ring is displaced by means of a spring, from the position corresponding to the very close distance to the position corresponding to the infinite distance, an in-focus signal is produced, namely a "0" is delivered from the gate G5 to stop the movement of the distance ring. Below, the case when for some reason the distance ring has been displaced too far will be explained. In this case, the output of the amplifier IC7 once corresponds to that of the digital-to-analog converter D-A, then the gate G5 delivers the "0" signal and the timer TM starts to operate as mentioned above, and then the output of the amplifier IC7 does not correspond to the output of the D-A. Thus, the level of either the output of IC9 or the output of IC10 becomes "0", so that the level of the output of the gate G4 becomes "1" in such a manner that the level of the output of the gate G34 becomes "1" after the lapse of a certain time determined by means of the timer TM. The "1" signal from the gate G34 is delivered to the OR gate G7 shown in FIG. 1(B) to set the flip-flop F2 and also close the gate G8 through the inverter i16. Consequently, Q of the flip-flop F2 becomes "1" to rotate the motor M in the forward direction as mentioned above, whereby because the gate G8 is closed, the magnet clutch MC does not operate. Thus, the rotation of the motor M is not transmitted to the gear 15, whereby only the rack 38 is driven through the gears 35, 36 and 37. Thus, in this case, the film is not wound up, while only the spring of the distance ring is charged. On the other hand, the gate G3 continues to deliver "0", because the output of IC9 or IC10 after the lapse of a time determined by means of the timer TM, to prohibit the shutter release operation. Further, when the spring has been charged, as mentioned above, the switch SW8 is closed, the flip-flop F2 is reset, as mentioned above, to stop the motor M. Thus, the mechanism of the camera resumes the state existing before the distance measurement operation. At the same time the switch SW8 is closed, when the transistor TR13 is brought into the closed state, the transistor TR12 is brought into the opened state. Thus, at the same time, when the transistor TR10 is brought into the opened state to release the holding of the voltage V3 in the current supply circuit III, the transistor TR2 is also brought into the opened state to release the holding of the voltage V2 in the current supply circuit II, and all the circuits resume the state before the photographer. In this way, the shutter cannot be released when the distance measurement operation is not carried out properly, whereby the camera automatically resumes the state before photographing.

Further, when, as the result of the distance measurement it is proved that the distance measurement is impossible, no detection signal is delivered from the gate G19, whereby the level of all the outputs from the output terminals Q1, Q2 and Q3 of the counter CON1 becomes "1". Thus, the gate G16 delivers the "1" output to set the flip-flop F4 through the gate G15, while the Q output of F4 becomes "0" to bring the gate G13 into the closed state and prohibit the driving of the distance ring. Further, the output from the gate G16 sets the flip-flop F3 through the OR gate G15 to bring the gate G18 into the closed state and stop the counting operation of the counter 1. Further, at the same time by means of the "1" signal from the Q terminal of the flip-flop F4, the transistor TR9 is brought into the conductive state to light up the light emitting diode LED3 and show the photographer that the distance measurement is impossible. When the distance measurement is impossible as mentioned above, the distance measurement operation is not carried out. Accordingly, by means of LED3, an alarm is indicated that the distance measurement is impossible.

Below, the self-timer photographing mode will be explained In this case, the shutter button is operated in the state in which the self-timer switch SW5 is closed in advance. Thus, the distance measuring as well as the light measuring operation are carried out as mentioned above. Assuming that the object brightness is proper, the comparators IC2 and IC3 deliver the "1" output and the NAND gate G12 of the speed light circuit also delivers the "1" output. When the second stroke of the shutter button is operated in the above-mentioned state, the switch SW2 is closed to carry out the above-mentioned distance measuring operation. When the distance measuring operation has been completed, the "1" output of the gate G3 is delivered to carry out the above-mentioned shutter release operation, whereby the switch SW5 is closed in the self-timer photographing mode so that the AND gate G30 delivers the "0" output. Consequently, the flip-flop F6 is not set by means of the second stroke so that the shutter release operation is not carried out immediately after the second stroke operation but after the lapse of a time determined by means of the self-timer. That is, in this case, the switch SW5 is in the closed state so that when the switch SW2 is closed by means of the second stroke, the "1" output is delivered to both the input terminals of the AND gate G29 through the inverters i12 and i13 in such a manner that the gate G29 delivers the "1" output. In this way, the flip-flop F5 is set and the level of the output at the Q terminal of F5 becomes "1". Thus, the gate G26 is brought into the opened state while the counter CON2 counts the clock pulses from the clock oscillator CK2.

When the counter CON2 has counted a certain determined number of the clock pulses, a carrier signal is delivered from the terminal C to reset the flip-flop F5 through the OR gate 28. Thus, the level of the output at the Q terminal of F5 becomes "0" to bring the gate G20 into the closed state, whereby the counter CON2 stops counting, while on the other hand, the carrier signal sets the flip-flop F6 through the OR gate G27 in such a manner that the level of the output at the Q terminal becomes "1" to supply current to the shutter opening magnet through the gates G25 and G24. Thus, at the time of the self-timer photographing, the shutter release operation is carried out after the lapse of a time counted by means of the counter CON2. Accordingly, at the time of the self-timer photographing, the pulses delivered through the gate G26 is transmitted to the base of the transistor TR25, so that the light emitting diode LED4 flickers to display the self-timing time.

Below, the flash photographing mode will be explained.

In this case, the speed light switch SW3 is closed. Thus, the main condenser starts to be charged with the high voltage stepped up by means of the transformer T1. On the other hand, when the switch SW3 is operated, a voltage V4 is supplied to the current supply circuit IV to be applied to the AND gate G17 shown in FIG. 1(C). When in this state, the shutter button is operated, the distance measurement is carried out, while along with the second stroke, the distance measuring operation is completed to set the object distance information at the resistance VR2. Further, because at this time the switch SW3 remains in the closed state, a "0" signal is transmitted to the switch AS1 through the inverter i15 to open the switch AS1, while the switch AS2 is closed instead of the switch AS1. Consequently, the value of the current flowing through the transistor TR5 corresponds to the output of the amplifier IC8. Thus, the output of the amplifier IC8 is determined in accordance with the output of the amplifiers IC7 and IC6, whereby the output of the amplifier IC6 is determined by means of the value of the resistance VR1 on which the film sensitivity is set, while the output of the amplifier IC7 is determined by means of the value of the resistance VR2 on which the distance information is set. Consequently, the value of the current flowing through the transistor TR5 is determined in accordance with the film sensitivity and the object distance. In this way, in the case of the flash photographing mode, the value of the current flowing through the transistor TR5 is determined in accordance with the object distance and the film sensitivity. Thus, as mentioned above, along with the second stroke operation, the output of the gate G24 becomes "0", whereby the shutter is opened and the condenser C2 starts to be charged. Thus, the value of the charging current of the condenser depends upon the distance and the film sensitivity information so that the shutter time and the aperture value are decided in accordance with the distance and the film sensitivity in such a manner that the exposure is automatically controlled at the exposure value suited for flash photography. In this way, in the case of the flash photographing mode, the diaphragm is automatically controlled at the aperture value suited for flash photography, while the "1" signal is applied to the gate of the thyrister SCR through the inverter if the output of the comparator IC4 changes from "1" to "0", to bring the SCR in the closed state to discharge the trigger condenser C11 and trigger the discharge tube Xe for producing the flash light. Thus, when the shutter closing operation starts, the flash light is produced to complete the flash photography. In the case of the flash photographing mode, in this way, the aperture value and the shutter time are automatically controlled in accordance with the object distance and the film sensitivity to carry out proper flash photography. Further, in the case of flash photography, the output of the comparators IC2 and IC3 are determined in accordance with the object distance and the film sensitivity. Thus, the value of the resistances R11–R14 are determined to normally produce a "1", so that a "1" is normally applied to the (C) and (D) input terminal of the gate G24. When a "1" is delivered from the gate G25 after the completion of the distance measuring operation while a "1" is delivered from the NAND gate G12 after the neon tube LL1 has been lit up, the level of the output of the gate G24 becomes "0" to release the shutter.

Further, in the case of flash photographing mode, even when the distance is not detected during the distance measuring operation, if, along with the distance measuring operation, the value counted by means of the counter CON1 reaches a certain determined value (a value corresponding to the speed light photographable limit distance) in such a manner that Q1 and Q2 deliver the output "1", the AND gate G17 delivers a "1" to set the flip-flop F3 and lock the value counted by means of the counter CON1 at a certain determined value. Thus, in the case when the object is beyond the speed light photographable limit distance, the exposure is carried out with the exposure value corresponding to the above-mentioned limit distance.

Below, the film rewinding operation will be explained. In this case, along with the displacement of the rewinding knob in the direction of G, the engaging member 63 with the patrone is displaced upwards (in the direction of E) by means of the strength of the spring 64 to engage the member 63 with the lower part of the patrone. Thus, the engaging member 63 is secured on the shaft 61 so that the shaft 61 is also displaced in the direction of E. Along with the displacement of the shaft 61, the pin 61A is engaged into the notch 62 in the rear in such a manner that the gear 60 makes one body with the shaft 61. Consequently, the lever 65 engaged with the pin 61B provided on the shaft 61 is rotated in the clockwise direction. Along with the rotation of the lever 69, the lever 70 engaged with the lever 69 is rotated in the clockwise direction around the shaft 71 to displace the pin 27B engaged with the lever upwards.

Along with the upward displacement of the sprocket shaft 27, the sprocket is brought into the free state by means of the conventional state.

Further, along with the displacement of the rewinding knob 67 in the direction of G, the switch SW6 is closed in such a manner that the voltage V1 is supplied as a "1" signal to the base of the transistor TR20 through the switches SW6 and SW7. Thus, the transistor TR20 is brought into the closed state and a current flows through the motor M in the direction of B to rotate the motor M backwards. The rotation of the motor M is transmitted to the shaft 61 through the gears 56, 57, 58, 59 and 60 to rewind the film. At this time, the wind-up side is free from the influence of the rotation of the motor, because the magnet clutch MC is disconnected so that no rotation is transmitted to the spool side, while no rotation is transmitted to the charge part due to the one way clutch 34.

When the film has been rewound in this way, the film sensing lever is displaced along the direction of F by means of the spring 75 to open the switch SW7 and stop the motor. Thus, the film rewinding operation has been completed.

Further, in order to release the rewinding mechanism, the knob 65 is manually rotated in the counterclockwise direction, while the knob 67 is displaced in the direction opposite to G, to prohibit the clockwise rotation of the knob 65A. Thus, the rewinding mechanism is released.

As explained above in detail, in accordance with the photographing operation control device of the camera of the present invention, the photographing sequence is determined in accordance with the result of the distance measurement by means of the automatic focusing device and the shutter release operation is carried out only when the distance measurement has been carried out properly, while at the time of flash photography, the exposure amount is controlled in accordance with the distance information obtained as the result of the distance measurement. This arrangement is remarkably effective as the photographing operation control device for a camera having an automatic focusing device.

What is claimed is:

1. An auto-focusing device for a camera comprising:
   (a) an object distance measuring circuit for measuring an object distance and producing an output signal corresponding to the object distance;
   (b) a control circuit for generating an output signal corresponding to an object distance measured by the measuring circuit when the object distance is shorter than a predetermined limit value for flashing, and generating an output signal corresponding to the limit value irrespective of the object distance when it is beyond the limit value; and
   (c) setting means for performing a distance setting operation on the basis of the output signal from the control circuit.

2. A camera according to claim 1, which further comprises:
   (a) signal means for producing a signal when the object distance is properly measured by said distance measuring circuit; and
   (b) means for driving said setting means in response to the signal from the signal means.

3. A camera comprising:
   (a) a distance measuring circuit for measuring an object distance and producing an output corresponding to the object distance;
   (b) a detecting circuit for detecting a distance measuring operation of the distance measuring circuit and producing a signal when the object distance is detected by said measuring circuit;
   (c) adjusting means for adjusting the focus of the lens system on the basis of the output signal from the measuring circuit, said adjusting means becoming operative when the signal from the detecting circuit is produced;
   (d) a signal forming circuit for forming a signal corresponding to a limit value for flash photography when an object distance is longer than the limit value; and
   (e) control means for driving the adjusting means irrespective of the signal from the detecting means to perform the focusing operation by the adjusting means on the basis of the signal forming circuit at the time of flash photography.

4. A camera according to claim 3, further including an exposure control circuit which, for flash photography, adjusts the degree of exposure on the basis of said signal from the signal forming circuit.

5. A camera comprising:
   (a) an object distance measuring circuit for measuring an object distance and producing an output signal corresponding to the object distance;
   (b) detecting means for detecting the output signal of the measuring circuit, said detecting means sending the output signal measured by the measuring operation of the measuring dcircuit when the object distance measured by the measuring circuit is shorter than a predetermined limit value for flashing, and stopping the measuring operation by the measuring circuit when the output signal of the measuring circuit reaches the limit value at the time of the measuring operation by the measuring circuit; and
   (c) an exposure control circuit for controlling exposure on the basis of the output signal of the measuring circuit.

6. A camera comprising:
   (a) an object distance measuring circuit for measuring an object distance and producing an output signal corresponding to the object distance;
   (b) a control circuit for generating an output signal corresponding to an object distance measured by the measuring circuit when the object distance is shorter than a predetermined limit value for flashing, and generating an output signal corresponding to the limit value irrespective of the object distance when it is beyond the limit value; and
   (c) an exposure factor control circuit for controlling the exposure factor on the basis of the output signal of the control circuit.

7. A camera comprising:
   (a) automatic focusing means having measuring means for measuring an object distance, said focusing means automatically adjusting a focus of lens system of the camera on the basis of the object distance measured by the measuring means;
   (b) detecting means for detecting the focus adjusting operation by means of the automatic focusing means, and producing a signal when the focus adjusting operation on the basis of the measured object distance is properly performed;
   (c) a control circuit for adjusting the focus of the lens system by the focusing means on the basis of a predetermined limit value for flash photography irrespective of an object distance when the object distance is longer than the limit value and providing the signal when the focus adjustment is performed on the basis of the limit value; and
   (d) shutter release means for performing a shutter release operation in response to the signal.

8. A camera comprising:
   (a) a release operation member;
   (b) a switch associated with the release operation member;
   (c) a hold circuit for generating and holding an output in response to the switch;
   (d) a camera control circuit;
   (e) an electric switch for forming a current path to the camera control circuit in response to the output of the hold circuit;
   (f) automatic focusing means for automatically adjusting a focus of a lens system of the camera;
   (g) detecting means for detecting the focus adjusting operation by means of the automatic focusing means and producing a signal when the focus adjusting operation is improperly performed;

(h) reset means for resetting the hold circuit in response to the signal of the detecting means.

9. A device according to claim 8, in which the automatic focusing means is controlled by the camera control circuit.

10. A camera system comprising:
(a) a distance measuring circuit for measuring an object distance;
(b) a control circuit having a first photography mode in which a distance adjustment operation is performed on the basis of the output of the distance measuring circuit, and a second photography mode in which a distance adjustment operation is performed on the basis of the output detected by the distance measuring circuit when the object distance is within a limit distance of the flash light photography, and the distance adjustment operation is performed on the basis of the limit distance when the object distance is beyond the limit distance of the flash light photography;
(c) a flash device which emits flash of light when in an operative mode and is prohibited to emit flash of light when in an inoperative mode; and
(d) selecting means for selecting the operative mode or inoperative mode of said flash device, whereby the flash light photography mode of the exposure control circuit is selected when the operative mode of the flash device is selected by the selecting means.

11. A camera system according to claim 10, in which the selecting means is associated with a power source switch of the flash device, whereby the power source switch is opened when the operative mode of the flash device is selected by the selecting means.

* * * * *